United States Patent [19]
Adams

[11] Patent Number: 5,823,783
[45] Date of Patent: Oct. 20, 1998

[54] ROTATING PIE GRAPH: MATHEMATICS LEARNING TOOL

[76] Inventor: Mary Katherine Adams, P. O. Box 3040, Youngstown, Ohio 44511

[21] Appl. No.: 405,297

[22] Filed: Jun. 14, 1995

[51] Int. Cl.$^6$ ................................. G09B 23/02
[52] U.S. Cl. ..................... 434/208; 434/188; 434/198
[58] Field of Search ..................... 364/736; 434/196, 434/199, 205, 206, 214, 198, 208, 191, 188

[56] References Cited

U.S. PATENT DOCUMENTS

| | | | |
|---|---|---|---|
| 151,971 | 6/1874 | Harrington | 434/196 |
| 841,158 | 1/1907 | Koops et al. | 434/196 |
| 1,224,748 | 5/1917 | Jacobs | 434/198 |
| 1,836,643 | 12/1931 | Chesham | 434/198 |
| 2,611,193 | 9/1952 | Davis | 434/196 |
| 2,705,843 | 4/1955 | Hawkins | 434/196 |
| 3,024,540 | 3/1962 | Orth | 434/198 |
| 3,624,928 | 12/1971 | Felton | 434/198 |
| 4,633,070 | 12/1986 | Merkh | 434/198 |
| 4,920,033 | 4/1990 | Cress | 434/198 |
| 5,407,356 | 4/1995 | Sidrak | 434/188 |
| 5,470,234 | 11/1995 | Sher | 434/214 |

Primary Examiner—Paul J. Hirsch

[57] ABSTRACT

The present invention is directed to a system for demonstrating mathematic concepts, such as fractions and their equivalents. The system includes at least one device constituted by a pie chart sheet having a slot, and a rotating disk having a slit. The slit in the rotating disk provides a leading edge which is inserted through the slot on the chart page to allow the rotating disk to cover any selected portion of the chart. Because the cuts in both the pie chart on the chart sheet are radial, rotation of the disk about a common center point is facilitated.

3 Claims, 7 Drawing Sheets 5,823,783

ROTATING PIE GRAPH: MATHEMATICS LEARNING TOOL

FIELD OF INVENTION

The present invention is related to demonstration devices to facilitate learning. In particular, the present invention is directed to adjustable pie graphs for demonstrating the concept of mathematical fractions and their equivalents.

BACKGROUND ART

The use of teaching aids to demonstrate mathematical concepts such as fractions and their equivalents are well-known in the conventional art. Such devices and systems are often necessary in order to help young minds grasp otherwise abstract mathematical concepts. The key to such devices or teaching systems is the easy demonstration and manipulation of fractional values and their equivalents.

One example of such a device is disclosed in U.S. Pat. No. 1,836,643 to Chesham. This device includes two moveable disks which are separable. Preferably, these parts are used together on a stand in which they are easily detachable. The Chesham device is used primarily for the purpose of teaching a student to recognize portions or fractions of a circle by the shape or angle of a section revealed. With this device, only the markings which are deliberately revealed can be seen by the student rather than the markings or the entire disk.

U.S. Pat. No. 5,407,356 to Sidrak discloses transparencies which slid on top of each other. With this device, each transparency is capable of depicting only one value or set of values using a plurality of detachable or normally loose parts.

Each of the aforementioned examples of the conventional art is somewhat limited in it's capability to convey a clear manifestation of fractions and their equivalents. Also, because of multiple loose pieces, the devices of Sidrak and Chesham can be somewhat awkward to operate. Consequently, improvements are justified to more clearly depict various fractional values and their equivalents on an easily usable and adjustable device.

SUMMARY OF THE INVENTION

Consequently, it is one object of the present invention to facilitate an easy understanding of fractions and their equivalents.

It is another object of the present invention to provide a mathematical teaching device which is easy to use for demonstrating a wide variety of fractions and their equivalents.

It a further object of the present invention to provide a system that easily facilitates the demonstration of mathematical concrete equivalents to relatively young students having little familiarity with fractional equivalents.

It is still an additional object of the present invention to provide a mathematics teaching tool that is relatively simple to use.

It is yet another object of the present invention to provide a teaching system capable of demonstrating a wide variety of different fractional relationships and equivalents.

It is yet a further object of the present invention to provide a mathematical teaching system that can be facilitated in a variety of different sizes for easy demonstration within the classroom.

It is yet an additional object of the present invention to provide a mathematical teaching system that is not encumbered with a plurality of loose parts.

These and other goals and objects of the present invention are achieved by an apparatus for teaching mathematical skills that includes a first chart sheet having at least one pie chart area with a center and an outer perimeter configured thereupon. The pie chart area has a slot extending from the center of the pie chart to the outer perimeter. The pie chart is divided into at least two sections. The apparatus also includes a first rotatable disk having a radial slit extending from the center of the disk to the perimeter of the disk so that the rotatable disk has a slit edge. The disk is rotatably and slidably mounted to the first chart sheet so that the slit edge passes through the slot, and upon rotation of the disk variable portions of the chart area are exposed demonstrating the operation of fractions and/or decimals and/or percentages.

BRIEF DESCRIPTION OF THE DRAWINGS

FIG. 5(*b*) is a 8 part pie graph.

FIG. 5(*c*) is a 16 part pie graph.

FIG. 5(*d*) is a 32 part pie graph.

DETAILED DESCRIPTION OF THE PREFERRED EMBODIMENTS

Figure 1:
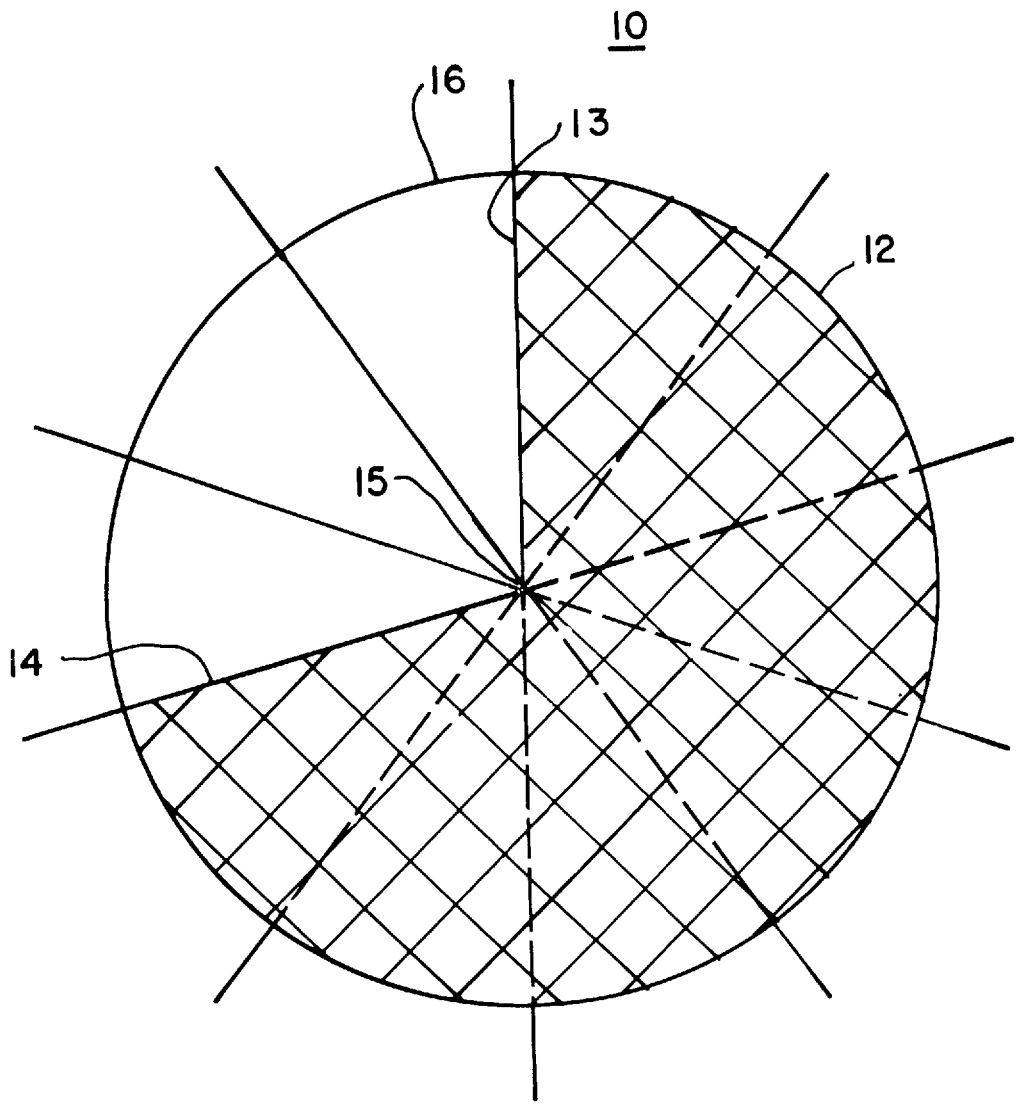
FIG. 1 is a 10 part pie graph depicting a pie chart sheet and rotatable disk arranged over the front surface of the pie chart sheet.
Figure 2:
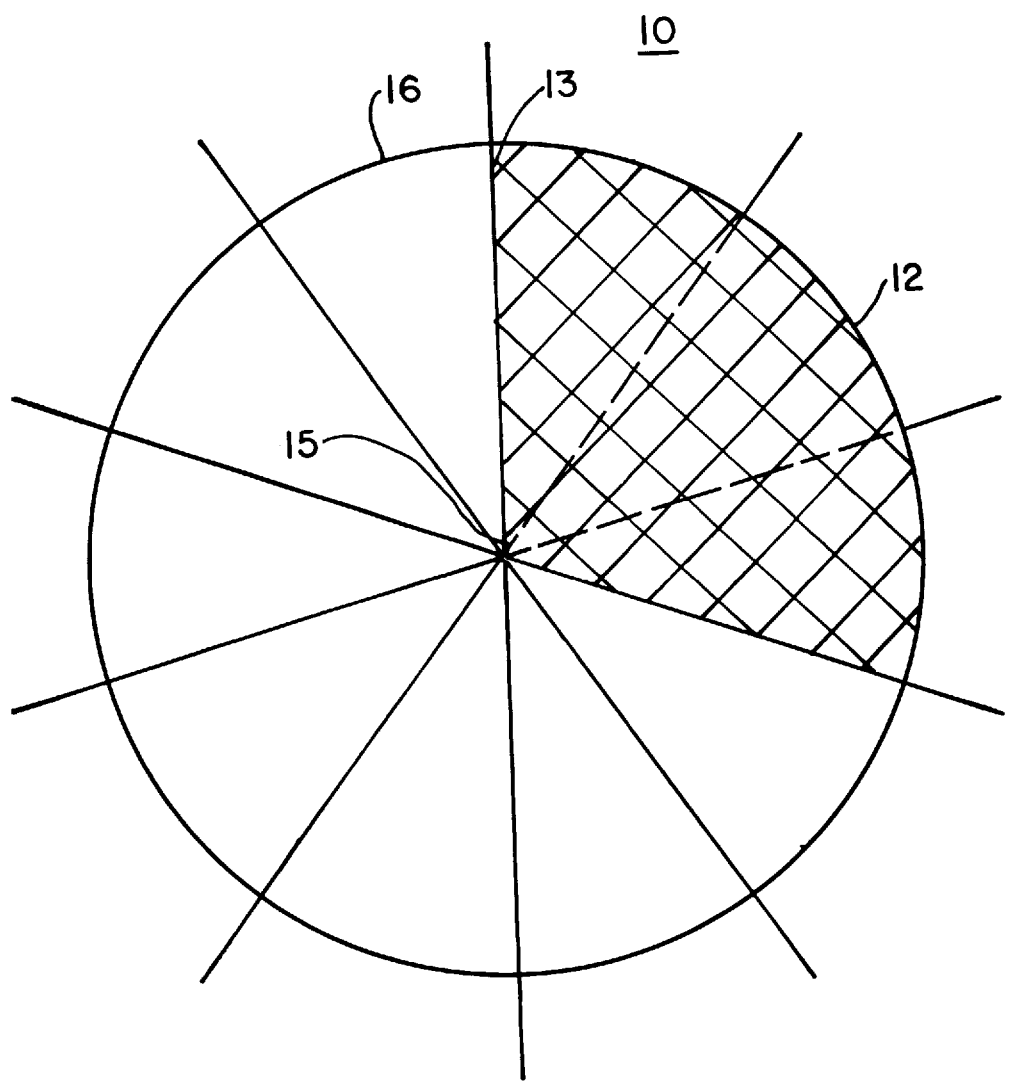
FIG. 2 is the rear view of the pie chart sheet of FIG. 1, depicting the portion of the rotatable disk that is not arranged over the front surface of the chart sheet.

FIG. 1 depicts a 10 part pie graph which exemplifies the relationship between the pie chart sheet 10 and the rotatable disk 12. FIGS. 1 and 2 are representations of two sides of a working model of the present invention as originally submitted to the U.S. Patent and Trademark Office. FIG. 1 depicts the front of pie chart 10 while FIG. 2 depicts the reverse side of pie chart 10.

The present invention is essentially constituted by two parts, a pie chart having a center 15 and an outer periphery 16 contained on a first side of a chart sheet 10, and a rotatable disk 13 arranged on both sides of chart sheet 10.

This arrangement is facilitated by a radial slot 13 running from the center of the pie graph to the periphery 16. The rotatable disk 12 also contains a slit that results in a leading edge 14 which is inserted through slot 13 thereby permitting the rotatable disk to be arranged on front and rear sides of pie chart sheet 10. The radial slit on the rotatable disk extends from the center of the rotatable disk so that the center point of the rotatable disk and center point 15 on pie chart sheet 10 coincide, and the rotatable disk can be pivoted around both center points when they coincide.

When rotatable disk 12 is extended through slot 13 so that leading edge 14 is positioned as shown in FIG. 1, the reverse side of chart sheet 10 would be as depicted in FIG. 2 with the remainder of the rotatable disk 12 extending through slot 13 as shown in FIG. 2.

The center point of rotatable disk 12 coincides with the center 15 of the pie chart so that the rotatable disk can easily rotate in a circular manner to cover virtually all of pie graph on the front of chart sheet 10 or can be withdrawn to the reverse side entirely. Thus, any portion of the pie chart can be covered with rotatable disk 12 to demonstrate fractional portions of the pie graph on the front of pie chart sheet 10.

Figure 3:
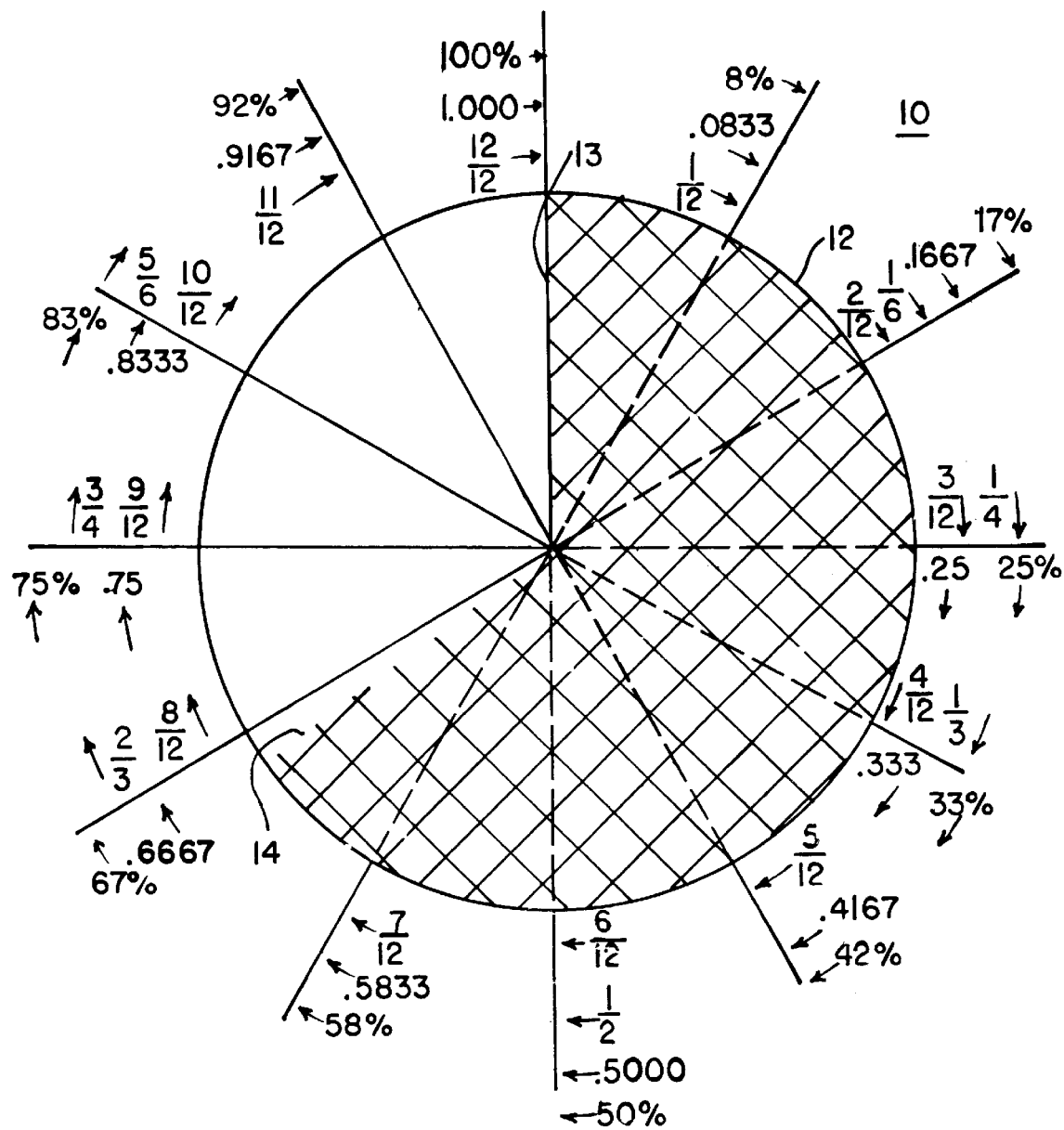
FIG. 3 is a 12 part pie graph with fractional, decimal and percentage designations.
Figure 4:
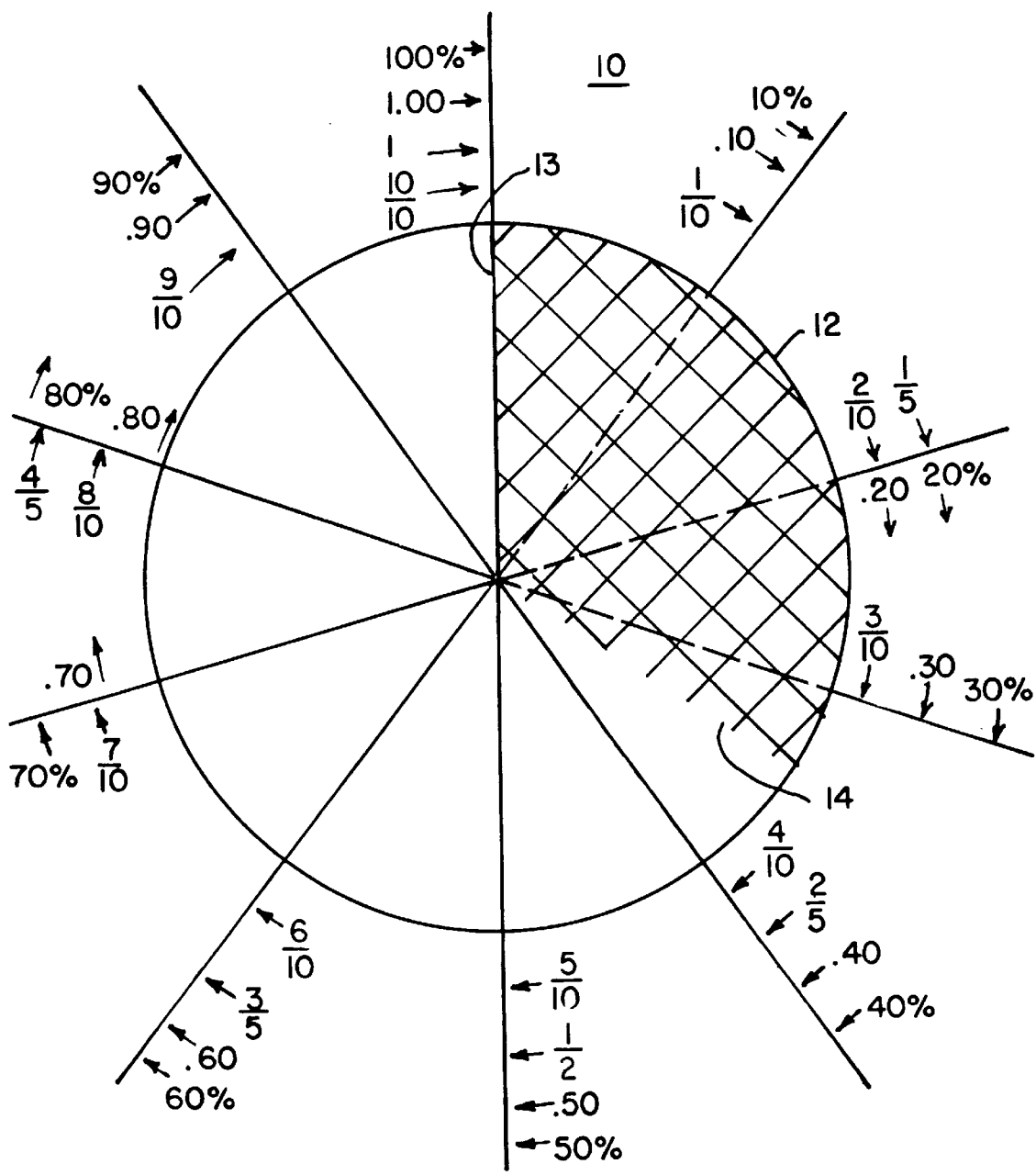
FIG. 4 is a 10 part pie graph having fractional, decimal and percentage indications.
Figure 5A:
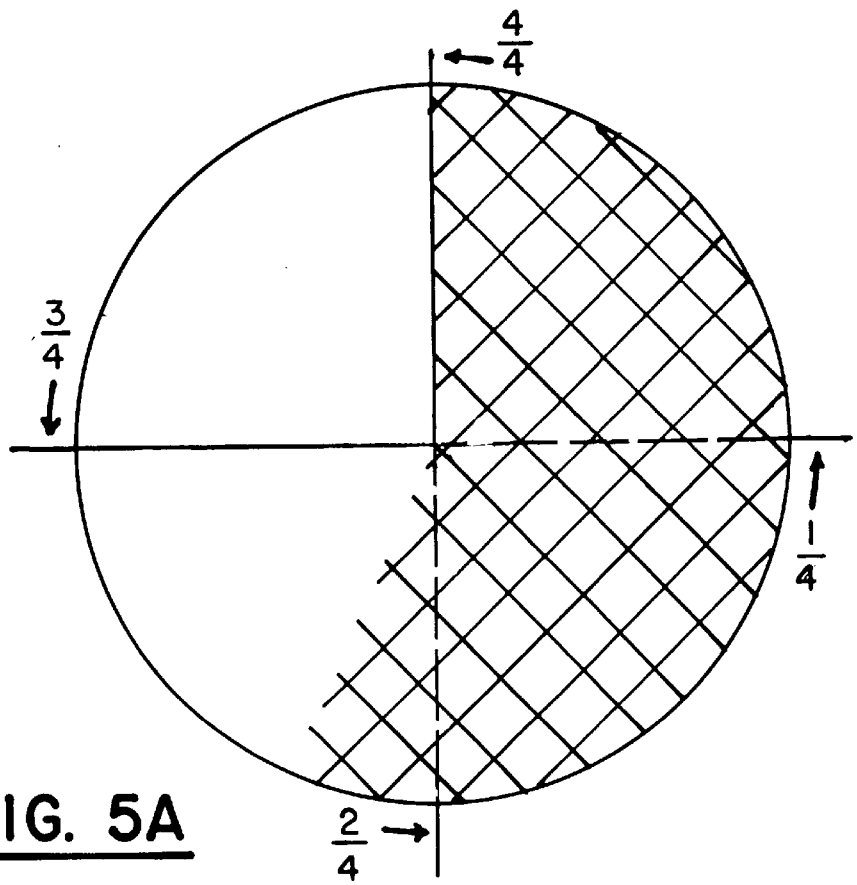
FIG. 5(*a*) is a 4 part pie graph.
Figure 5B:
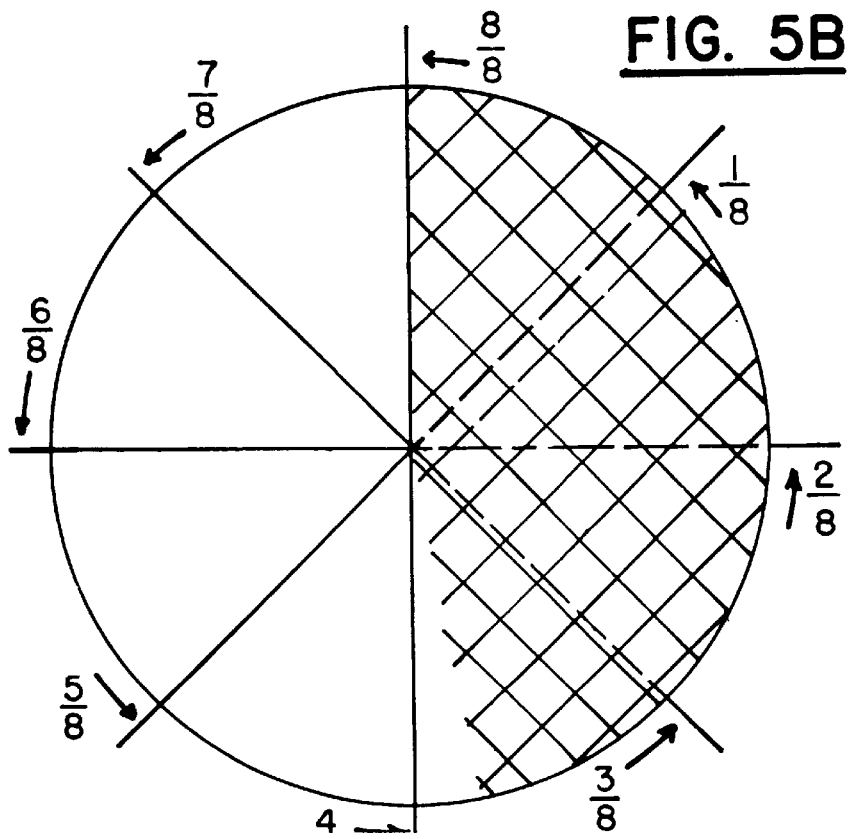
Figure 5C:
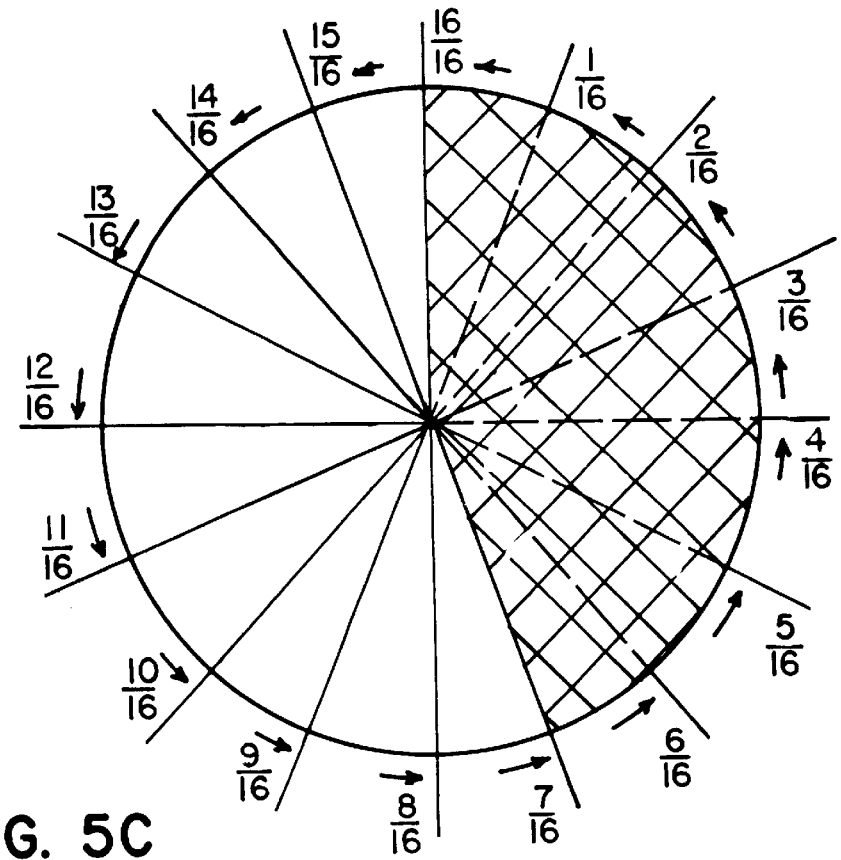
Figure 5D:
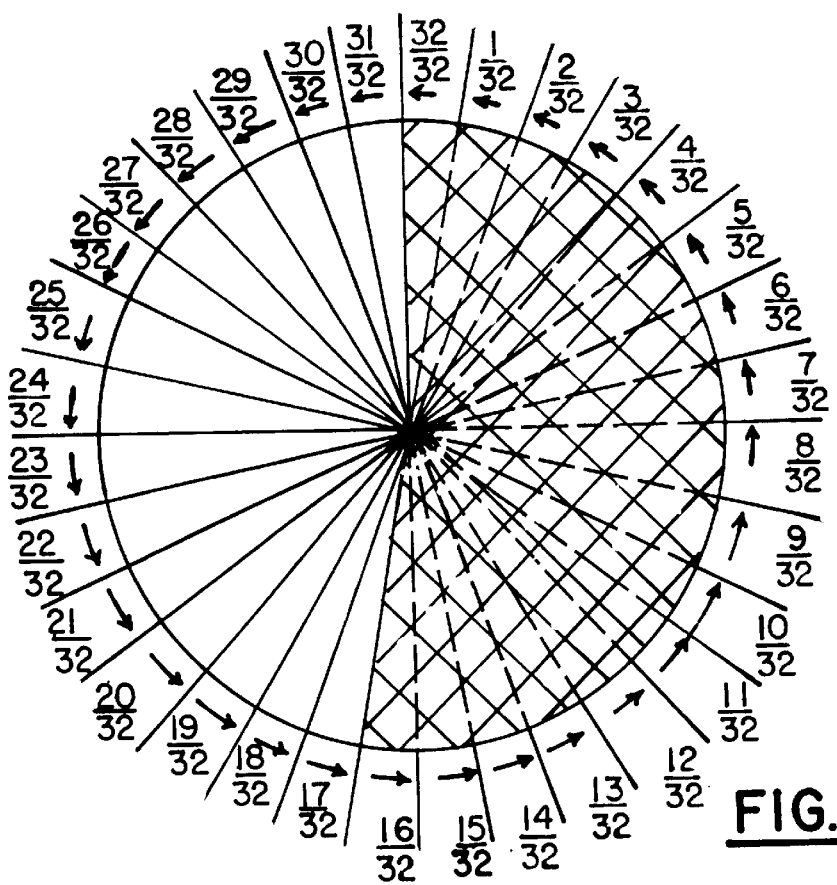

FIGS. 3 and 4 depict 12 part and 10 part pie graphs, respectively. Each portion of each of the graphs is labeled with drawing designations indicative of appropriate fraction represented by that portion of the graph, as well as various equivalents to that fraction. The drawing designation numerals are arranged outside of the periphery 16 of the graph so that fractional designations are not covered or otherwise obscured by the rotating disk 12.

FIGS. 5(a)–5(d) depict a series of pie graphs such as would be used for illustrating the relationships between different fractions and their subdivisions By using FIGS. 5(a)–5(d) in conjunction with each other, it is easy to demonstrate that the fractions 2/8 in an 8 part pie graph is the same as 1/4 on a 4 part pie graph, and fraction 3/12 on a 12 pie graph. Students can turn the pie graph clockwise to add fractions, percents or decimals and counterclockwise to subtract. To find out how much is left from a total of 100% of the graph, the student can turn the pie graph over to study the reverse image on the opposite side of the chart sheet 10. By allowing the students to operate a plurality of the inventive device in conjunction with each other, the understanding of otherwise abstract mathematical concepts is more easily facilitated. Unlabeled pie graphs such as those depicted in FIGS. 1 and 2 can be used for testing the knowledge of the students.

Figure 6:
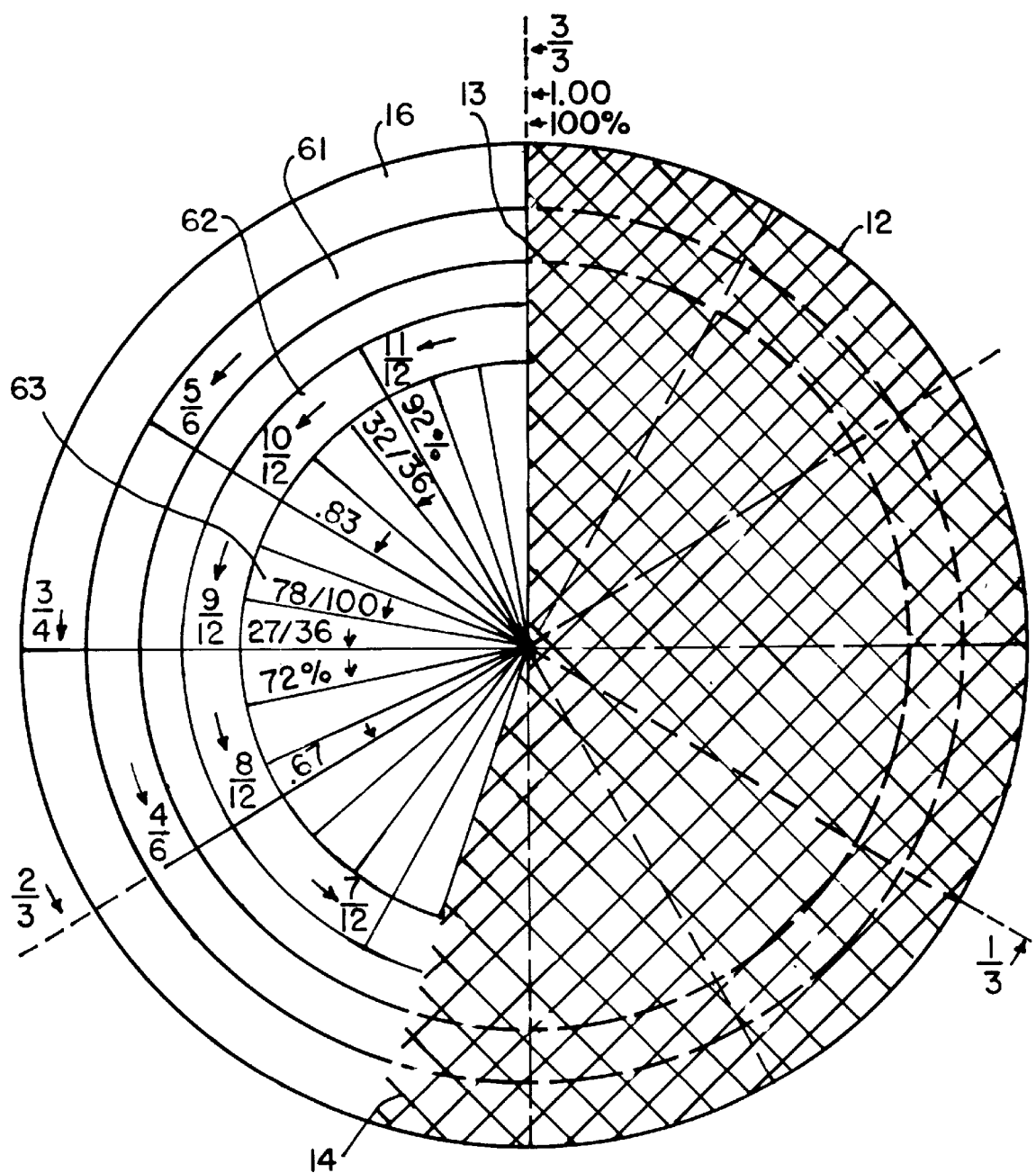
FIG. 6 is a 36 part pie graph having a plurality of concentric gradations and indications.

FIG. 6 depicts another variation of the present invention, and includes concentric rings 61, 62 and 63. Each of the concentric rings depicts a different set of fractional subdivisions of that portion of the graph, and is labeled accordingly. Thus, the student is able to move from easily recognizable portions of the pie chart to less easily recognized portions, and obtain a greater understanding of the various subdivisions of a fractional portion of the graph.

The pie chart sheet 10 and the rotatable disk 12 can preferably be made out of plastic-coated paper (as originally submitted to the U.S. Patent and Trademark Office). However, any other appropriate material can also be used for either part of the inventive device.

While coinciding the center point 15 of both the pie chart sheet and the rotatable disk allows the two to remain firmly attached, other expedients can be used to maintain attachment. One example would be a rivet to hold the two together at the center point 15.

Although a number of embodiments of the present invention have been presented by way of example, the present invention, should not be limited thereby. Rather, the present invention should be interpreted to encompass all variations, permutations, adaptations, modifications and other embodiments that would occur to one skilled in this art who has been taught the present invention according to the present application.

I claim:

1. An apparatus for teaching mathematical skills comprising:

(a) a first chart sheet including at least once pie chart area having a center and outer perimeter configured thereon and having a radial slot within said pie chart area extending from said center to said outer perimeter said pie chart area being divided into at least two sections; and, (b) a first rotatable disk having a radial slit extending from the center to the perimeter of said rotatable disk, said rotatable disk having a slit edge, said disk being rotatably and slidably mounted to said first chart sheet so that said slit edge passes through said slot, whereby upon rotation of said disk more or less of said pie chart area is exposed, demonstrating operation of fractions and/or decimals and/or percentages.

2. The apparatus for teaching mathematical skills according to claim 1, further comprising a second chart sheet having at least two pie chart areas and associated rotatable discs with said pie chart areas having total numbers of sections which are multiples of each other, whereby upon rotation of the separate disks operation of fractional equivalence is demonstrated.

3. The apparatus for teaching mathematical skills according to claim 1, further comprising a plurality of representations of concentric pie charts, whereby upon rotation of the first rotatable disk fractional equivalencies, fractional relationships and/or of decimals and/or percentages are demonstrated.

* * * * *